United States Patent Office 2,700,050
Patented Jan. 18, 1955

2,700,050

SEPARATION OF OXIDATION PRODUCTS

George Riethof and George P. Brown, Jr., Pittsburgh, Pa., assignors to Gulf Research & Development Company, Pittsburgh, Pa., a corporation of Delaware No Drawing. Application November 7, 1949,
Serial No. 126,056

7 Claims. (Cl. 260—452)

This invention relates to the separation into components of the products of the partial oxidation of higher molecular weight paraffin hydrocarbons, and more particularly to a process for obtaining acids and esters from the product of the partial oxidation of paraffin hydrocarbons containing an average of at least 12 carbon atoms per molecule.

When higher molecular weight paraffin hydrocarbons are partially oxidized, desired oxidation products such as acids and esters are produced mixed with a small amount of highly oxidized materials such as polybasic, hydroxy, and ketonic acids, with other oxidized products such as alcohols or ketones and with the material which remains unoxidized. The acids and esters produced are a series of compounds having different molecular weights, melting points, and other properties. As the oxidation is continued, more and more highly oxidized materials are obtained until finally when oxidation is complete there are practically no acids and esters remaining. The degree of oxidation may be varied depending upon the products desired.

When a paraffin hydrocarbon such as a wax having an average of about 25 carbon atoms per molecule is partially oxidized, the lower molecular weight acids and esters produced are desirable for many purposes, such as for use in conjunction with hydrocarbons. For example, these acids and esters may be used as additives to lubricating oils. The higher molecular weight acids and esters, however, which remain mixed with the lower molecular weight acids and esters even after the unoxidized material is removed, are of no value for such use because of their high melting points and because they raise the pour point a considerable amount and separate at low temperatures. On the other hand, the acids and esters of higher molecular weight are of value in a number of cases where the lower molecular weight oxidation products are not. For example, higher molecular weight oxidation products may be used in the manufacture of greases. In like manner the other components of the partially oxidized waxes also have a number of special uses.

A method of separating the partial oxidation product of higher molecular weight paraffin hydrocarbons into a number of valuable fractions is of special interest when applied to a hydrocarbon mixture such as foots oil because it is readily available in large quantities and because it is of much less value than the fractions obtained. However, in order that the various components of the partial oxidation product may have value it is necessary to separate them efficiently.

We have found that the products of the partial oxidation of higher molecular weight paraffin hydrocarbons may be separated into the most highly oxidized material, a series of valuable fractions of acids and esters having increasing molecular weights and melting points, and differing in other properties, and a fraction containing alcohols, ketones, and the unchanged material. We accomplish this by treating such a partial oxidation product by the process described below.

In accordance with this process the product of the partial oxidation of higher molecular weight paraffin hydrocarbons is mixed with a lower aliphatic alcohol selected from the group consisting of methanol, ethanol and isopropanol in an amount sufficient to dissolve only part of the oxidation product. The temperature of the mixture is then adjusted to a separation temperature, the solid phase is separated from the liquid phase present at the separation temperature, thus producing an extract phase and a residue. The residue is then mixed with the same or a different lower aliphatic alcohol of the class described, in an amount sufficient to dissolve only part of the remaining oxidized products. The temperature of the mixture is adjusted to a separation temperature and an extract phase and a residue are then obtained as before. The mixing and separation are repeated in a similar manner as many times as desired, using the same or different lower aliphatic alcohol of the class described, each time using the residue from the previous extraction step as the starting material.

We have found that by carrying out the process of our invention it is possible to make an efficient separation of acids and esters from the product resulting from partially oxidizing higher molecular weight paraffin hydrocarbon mixtures having an average of at least 12 carbon atoms per molecule, and preferably containing an average of from 15 to 30 carbon atoms per molecule, and particularly a paraffin wax. When a partially oxidized wax is mixed with a relatively large amount of a lower aliphatic alcohol of the class described above, we have found that the unoxidized wax is substantially insoluble, the oxidized products are soluble, and the lower molecular weight oxidation products are preferentially soluble. In the present process, where a regulated small amount of the alcohol is employed, in the first extraction step the polybasic, hydroxy and ketonic acids are preferentially separated. The extraction steps can be regulated to leave the ketones and alcohols with the unoxidized material, thus furnishing an excellent material for blending with fresh paraffin hydrocarbons to form the charge to the oxidation unit employed for the partial oxidation of the paraffin hydrocarbons.

While any of the three alcohols previously mentioned can be employed in the present process, methanol has been found to give excellent results and will usually be preferred. Because of the greater solubility of both oxidized and unoxidized material in ethanol or isopropanol, desirable results are obtained when methanol is used as a solvent for a number of extraction steps, and ethanol or isopropanol is used as the solvent in the later extraction step or steps.

The ratio of the amount of the lower aliphatic alcohol to the amount of the partial oxidation product treated is controlled to obtain the desired number of fractions. The saponification number of the material treated indicates the relative amount of acids and esters present and thus the amount of solvent to be added may preferably be expressed as cubic centimeters of solvent per 100 grams of material treated per unit saponification number. The amount of solvent employed in each extraction step may be kept constant. In certain cases, it is desirable to use a small amount of solvent per 100 grams of material treated per unit saponification number in the first extraction step in order to remove only the polybasic, hydroxy, and ketonic acids in this extraction step, a larger amount of solvent in the next step, and about the same amount per 100 grams of material treated per unit saponification number in each of the succeeding extraction steps. It is not necessary, however, to keep the amount of solvent used in each extraction step substantially constant after the first extraction step, but instead the amount may be varied as desired to obtain fractions each containing compounds having desired properties. If the saponification number does not vary greatly, however, it is convenient to keep the amount of solvent per 100 grams of material treated substantially constant.

Thorough mixing of materials being treated and the alcohol may be accomplished by agitating the mixture of the alcohol and the partial oxidation product at an advanced temperature until equilibrium is substantially established. This temperature should be sufficiently high that the material which is in solid phase at the selected separation temperature is at least in molten condition, but below the boiling point of the alcohol. Temperatures of about 105° to about 140° F. give excellent results. When treating partially oxidized wax with methanol in this temperature range, usually two liquid phases are obtained. When the mixture is cooled, the insoluble material settles rapidly and forms a solid cake at about 85° F. At lower temperatures crystals are formed. For efficient separation a subatmospheric separation temperature, that is a temperature below 77° F. such as 30° to 50° F., is preferred to the temperature at which the cake originally forms, because hydrocarbons soluble in higher melting point acids and esters crystallize causing a sharper separation of the oxidized material into fractions having different properties such as different molecular weights.

The process of the invention, in addition to being useful for obtaining fractions of different molecular weights, may also be used to obtain fractions of predetermined melting points. In addition, because the oxidized products removed are chiefly acids and esters, conditions may be adjusted to obtain fractions, each within a desired range of neutralization numbers or saponification numbers. A fraction of oxidized material obtained as a filtrate in one of the extraction steps may be further divided into sub-fractions, each having a different molecular weight, melting point, and other different properties, by repeating the procedure on such a fraction one or more times. The solid cake, which first forms during cooling at an intermediate temperature between the mixing and the separation temperature, may be separated from the liquid phase, and the crystals formed when the liquid phase is cooled to the separation temperature may also be separated, thus obtaining additional fractionation during the one extraction step.

A preferred embodiment of this invention is illustrated in the following example.

EXAMPLE 1

Paraffin wax is oxidized to produce a partially oxidized product having a saponification number of 143.5, a neutralization number of 42.6, an average molecular weight of 522, and a melting point of 87.2° F. 100 grams of the partial oxidation product is thoroughly mixed with about 280 cc. of methanol at a temperature of 122° F. for one hour. The mixture is then cooled to 41° F. and filtered. The liquid and the solid phases are stripped of methanol for control purposes. The stripped solid phase residue weighing 67 grams is contacted with about 188 cc. of methanol (280 cc. per 100 grams of material treated). After thorough mixing as before, the mixture is cooled to 41° F. and again the liquid and solid phases are separated and stripped of methanol. This procedure is repeated with the same volume of methanol per 100 grams of material treated, and then with the same volume of ethanol per 100 grams of material treated. In the fourth extraction step using ethanol the crystals formed at about 86° F. are collected separately and weighed. The remaining material is cooled to 41° F. and the substantially insoluble residue obtained is weighed. The residue containing unchanged wax, alcohols, ketones, and some unextracted acids and esters is returned for reoxidation. Mixed with fresh wax, it is an excellent starting material for this purpose.

The first extraction filtrate, weighing about 33 grams after the solvent has been removed, is sampled and is then further separated into sub-fractions having different molecular weights by an additional treatment with about 93 cc. of methanol (280 cc. per 100 grams of material treated). The molecular weight, neutralization number, saponification number, and melting point are determined for each fraction and sub-fraction and for the crystals and residue of the fourth extraction step.

The results are given in Table I which follows. In addition, the cubic centimeters of solvent per 100 grams of material treated per unit saponification number are given together with the neutralization number and saponification number of the total residue of the fourth extraction step based on the results obtained from the crystals first formed and the cake formed at the separation temperature. The neutralization numbers were determined by method, ASTM D663–46T; the saponification numbers by method, ASTM D94–48T; the melting points by method, ASTM D87–42; and the molecular weight ebullioscopically.

Table I
SEPARATION OF PRODUCT OF PARTIAL OXIDATION OF WAX
[280 cc. of solvent used per 100 grams of material treated.]

|  | Partial Oxidation Product | First Extraction | Second Extraction | Third Extraction | Fourth Extraction | | |
|---|---|---|---|---|---|---|---|
| Solvent | | Methanol | Methanol | Methanol | Ethanol | | |
| ccs. of Solvent per 100 Grams Material Treated per Unit Saponification Number | | 1.96 | 2.59 | 3.27 | 3.59 | | |
| | | | Insoluble Fraction | | | | |
| | | | | | Extraction Crystals | Insoluble Cake | Total Residue** |
| Grams of Solvent-Free Material | 100 | 67 | 55.6 | 51.2 | 8.5 | 39.6 | 48.1 |
| Molecular Weight | 522 | 513 | 552 | 526 | 462 | 538 | (*) |
| Neutralization No | 42.6 | 22.8 | 11.6 | 5.3 | 10.8 | 3.5 | 4.81 |
| Saponification No | 143.5 | 107.8 | 85.7 | 78.4 | 85.9 | 73.2 | 75.5 |
| Melting Point, ° F | 87.2 | (*) | 99.9 | 100.1 | 115.8 | 120.1 | (*) |
| | | | Soluble Fraction | | | | |
| | | | | | Total Liquid Phase | | |
| Grams of Solvent-Free Material | | 33 | 11.4 | 4.4 | 3.1 | | |
| Molecular Weight | | 457 | 475 | 513 | 500 | | |
| Neutralization No | | 53.4 | 68.4 | 47.7 | 22.6 | | |
| Saponification No | | 211.1 | 210.3 | 178.2 | 156.3 | | |
| Melting Point, ° F | | 55.5 | 56.2 | 66.6 | 69.3 | | |

Table I—Continued
ADDITIONAL SEPARATION OF SOLVENT-FREE FIRST FILTRATE

| | Solvent-free Filtrate of First Extraction | Additional Extraction |
|---|---|---|
| Solvent | | Methanol |
| ccs. of Solvent per 100 Grams Material Treated per Unit Saponification Number | | 1.33 |
| | | Solid Phase Material |
| Grams of Solvent Free Material | 33 | 10.9 |
| Molecular Weight | 457 | 438 |
| Neutralization No | 53.4 | 44.2 |
| Saponification No | 211.1 | 190.4 |
| Melting Point, ° F | 55.5 | 67.4 |
| | | Liquid Phase Material |
| Grams of Solvent-Free Material | | 22.1 |
| Molecular Weight | | 442 |
| Neutralization No | | 50.6 |
| Saponification No | | 214.2 |
| Melting Point, ° F | | 50.1 |

*Results not obtained.
**Calculated results.

It may readily be seen that as a result of the extraction carried out in the example, four fractions, the crystals and the cake from the fourth extraction are obtained. The filtrate from the first extraction is further separated into two fractions. The degree of extraction can be varied as desired, as pointed out above. In ordinary practice it will not be necessary to remove the solvent from the residue in each extraction step.

Another embodiment using partially oxidized foots oil as the starting material is presented in the following example.

EXAMPLE 2

Foots oil composed of paraffin hydrocarbons containing an average of 20 carbon atoms per molecule is oxidized in the presence of vanadium pentoxide with oxygen at 180° C. to produce a partial oxidation product having a saponification number of 123.6, a neutralization number of 32.0, and an average molecular weight of about 434, all determined as described in Example 1. This partial oxidation product is subjected to four extraction steps using methanol as the solvent in the manner described in Example 1, employing separation temperatures of about 35° F. The conditions of the process and the results obtained are shown in the following Table II.

fication numbers of the materials treated in these extractions.

It will be understood that the methods disclosed in the foregoing examples are merely illustrative of the invention and that the conditions may be varied. For example, the quantity of methanol, ethanol, or isopropanol to be employed in each extraction step will depend upon the number of fractions desired, the separation temperature employed, the specific nature of the solvent, and the characteristics of the partial oxidation product subjected to treatment, particularly its saponification number. A high saponification number indicates the presence of a relatively large amount of acids and esters which are readily soluble and therefore under otherwise similar conditions a smaller amount of solvent per 100 grams of material per unit saponification number may be used than when a lower saponification number product is treated.

In general, for most effective results there should be employed from 0.5 to 4 cubic centimeters of methanol, ethanol or isopropanol in each extraction step per 100 grams of material treated per unit saponification number, it being understood that the specific amount of solvent within this range employed in a given case would be selected so as to hold in solution at the separation tem-

Table II

| | First Extraction | Second Extraction | Third Extraction | Fourth Extraction |
|---|---|---|---|---|
| Methanol (ccs.) | 190 | 115 | 80 | 60 |
| Material Treated: | | | | |
| Weight (Grams) | 100 | 76 | 63.8 | 56 |
| Saponification No | 123.6 | 100 | 83 | 70 |
| Neutralization No | 32.0 | 27.2 | 23.9 | 22.1 |
| Molecular Weight | 434 | (*) | (*) | (*) |
| Soluble Fraction (Methanol Free): | | | | |
| Weight (Grams) | 24 | 12.2 | 7.7 | 4.5 |
| Saponification No | 195 | 194 | 170 | 162 |
| Neutralization No | 46.2 | 45.1 | 38.3 | 29.1 |
| Molecular Weight | 360 | 380 | 392 | 430 |
| Insoluble Fraction (Methanol Free): | | | | |
| Weight (Grams) | 76 | 63.8 | 56 | 51 |
| Saponification No | 100 | 83 | 70 | 60 |
| Neutralization No | 27.2 | 23.9 | 22.1 | 21.0 |
| Molecular Weight | (*) | (*) | (*) | (*) |
| ccs. Methanol per 100 Grams Material Treated Per Unit Saponification No | 1.5 | 1.5 | 1.5 | 1.5 |

*Results not obtained.

It will be noted from the data given in Table II that the saponificatiton numbers of the soluble fractions from the first two extractions are high, showing that these fractions contain a high proportion of desirable acids. Also, while the soluble fractions from the third and fourth extractions have somewhat lower saponification numbers and higher molecular weights, their saponification numbers are considerably higher than the saponiperature to be used only a fraction of the oxidized products. When obtaining at least three fractions of the oxidation products, we prefer to employ from 0.5 to 2 cubic centimeters of methanol, ethanol, or isopropanol per 100 grams of the partial oxidation product of the higher molecular weight paraffin hydrocarbon per unit saponification number for the first extraction step, and from 1 to 4 cubic centimeters of the solvent per 100 grams of the material treated per unit saponification number in each successive step.

It will be understood that the preferred separation temperature employed in practicing the present process will vary depending upon the particular starting material used, the division of products which is desired, and upon the amount and nature of the solvent used. Accordingly, it will be desirable in most cases to determine optimum conditions for carrying out the separation by testing a sample of the partially oxidized product with the desired solvent. In general, however, we have found that when the objective is to obtain a maximum yield of ordinary aliphatic acids and esters when using at least three separations, effective results are obtained by the use of subatmospheric temperatures, particularly temperatures within the range of about 30° to about 50° F.

Obviously many modifications and variations of the invention, as hereinbefore set forth, may be made without departing from the spirit and scope thereof and therefore only such limitations should be imposed as are indicated in the appended claims.

We claim:
1. A process which comprises treating a partial oxidation product of higher molecular weight paraffin hydrocarbons having an average of 15 to 30 carbon atoms per molecule at least two times with an alcohol selected from the group consisting of methanol, ethanol and isopropanol; the first of said treatments comprising mixing an alcohol of said class with said partial oxidation product in proportions corresponding to 0.5 to 4.0 cubic centimeters of the alcohol per 100 grams of said partial oxidation product per unit saponification number, said amount of said alcohol being sufficient to dissolve only part of the oxidized material present in said partial oxidation product soluble in said alcohol at a separation temperature below about 85° F., agitating the resulting mixture at an elevated temperature at which the undissolved portion of said partial oxidation product is at least in molten condition, then cooling said mixture to said separation temperature at which liquid and solid phases characteristic of said separation temperature are produced, and separating said liquid phase from said solid phase; and each succeeding treatment comprising mixing an alcohol of said class with the solid phase material from the preceding treatment in proportions corresponding to 0.5 to 4.0 cubic centimeters of the alcohol per 100 grams of the solid phase material per unit saponification number, said amount of said alcohol being sufficient to dissolve only part of the oxidized material present in said solid phase material soluble in said alcohol at a separation temperature below about 85° F., agitating the resulting mixture at an elevated temperature at which the undissolved portion of said solid phase material is at least in molten condition, then cooling said mixture to said last-mentioned separation temperature at which liquid and solid phases characteristic of said last-mentioned separation temperature are produced, and separating said last-mentioned liquid and solid phases; and recovering valuable oxidized components comprising acids and esters of progressively higher molecular weights from the liquid phases obtained in said treatments.

2. A process in accordance with claim 1 in which methanol is employed in the first of said treatments and ethanol is employed in the last treatment.

3. The process in accordance with claim 1 in which the partial oxidation product is a partial oxidation product of foots oil and in which methanol is employed in the first of said treatments and ethanol is employed in the last treatment.

4. A process which comprises treating a partial oxidation product of higher molecular weight paraffin hydrocarbons having an average of 15 to 30 carbon atoms per molecule at least two times with an alcohol selected from the group consisting of methanol, ethanol and isopropanol; the first of said treatments comprising mixing an alcohol of said class with said partial oxidation product in proportions corresponding to 0.5 to 4.0 cubic centimeters of the alcohol per 100 grams of said partial oxidation product per unit saponification number, said amount of said alcohol being sufficient to dissolve only part of the oxidized material present in said partial oxidation product soluble in said alcohol at a separation temperature of about 30° to about 50° F., maintaining the resulting mixture at an elevated temperature of about 105° to about 140° F., then cooling said mixture to said separation temperature at which liquid and solid phases characteristic of said separation temperature are produced, and separating said liquid phase from said solid phase; and each succeeding treatment comprising mixing an alcohol of said class with the solid phase material from the preceding treatment in proportions corresponding to 0.5 to 4.0 cubic centimeters of the alcohol per 100 grams of the solid phase material per unit saponification number, said amount of said alcohol being sufficient to dissolve only part of the oxidized material present in said solid phase material soluble in said alcohol at a separation temperature of about 30° to about 50° F., maintaining the resulting mixture at an elevated temperature of about 105° to about 140° F., then cooling said mixture to said last-mentioned separation temperature at which liquid and solid phases characteristic of said last-mentioned separation temperature are produced, and separating said last-mentioned liquid and solid phases; and recovering valuable oxidized components comprising acids and esters of progressively higher molecular weights from the liquid phases obtained in said treatments.

5. A process in accordance with claim 4 in which the partial oxidation product is the partial oxidation product of paraffin wax.

6. A process in accordance with claim 4 in which the partial oxidation product is the partial oxidation product of foots oil.

7. The process in accordance with claim 4 in which the partial oxidation product is a partial oxidation product of foots oil and in which methanol is employed in the first of said treatments and ethanol is employed in the last treatment.

References Cited in the file of this patent

UNITED STATES PATENTS

| Number | Name | Date |
|---|---|---|
| 1,782,964 | James | Nov. 25, 1930 |
| 1,835,600 | James | Dec. 8, 1931 |
| 1,885,199 | Hellthaler | Nov. 1, 1932 |
| 1,909,295 | Luther et al. | May 16, 1933 |
| 2,002,533 | Frolich et al. | May 28, 1935 |
| 2,581,712 | Rottig | Jan. 8, 1952 |

OTHER REFERENCES

Lange: Handbook of Chemistry, sixth edition, pages 300–682 (1946), Handbook Publishers Inc., Sandusky, Ohio.